Figure 1:
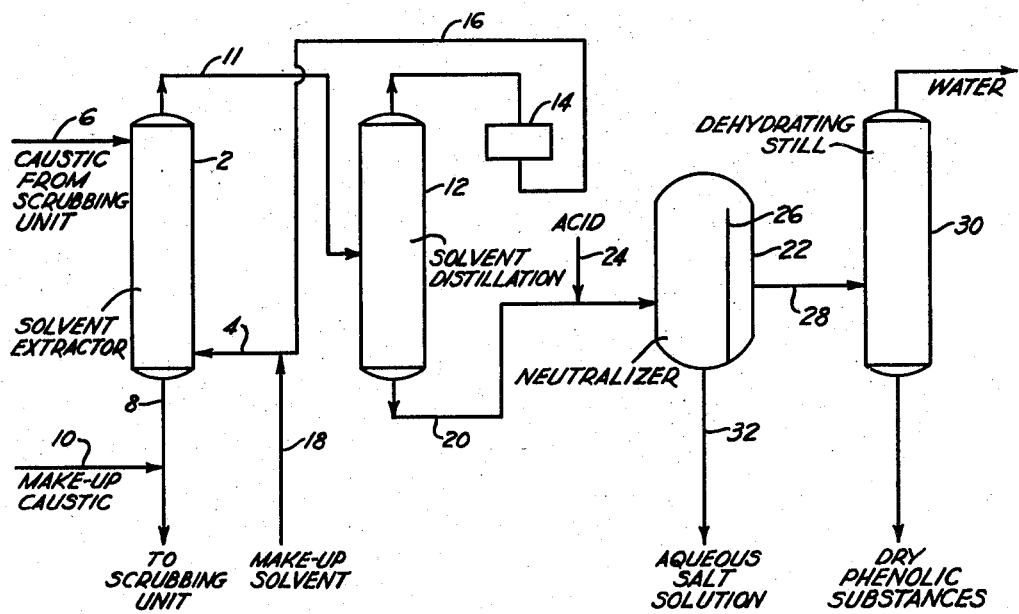

INVENTORS
WILLIAM I. GILBERT
RUSSELL G. HAY
JOHN G. McNULTY
BY

THEIR ATTORNEY an United States Patent Office 2,872,486
Patented Feb. 3, 1959

2,872,486
RECOVERY OF PHENOLIC SUBSTANCES

William I. Gilbert, Oakmont, Russell G. Hay, Fox Chapel, and John G. McNulty, Glenshaw, Pa., assignors to Gulf Research & Development Company, Pittsburgh, Pa., a corporation of Delaware Application October 26, 1954, Serial No. 464,732

13 Claims. (Cl. 260—609)

This invention relates to the separation of phenolic substances such as cresols, xylenols and thio-cresols from aqueous caustic solutions used to refine petroleum fractions or similar materials.

It is customary in the petroleum refining art to extract petroleum fractions such as gasoline, kerosene and lubricating oils with an aqueous caustic solution in order to remove impurities such as hydrogen sulfide, cresols, xylenols, sulfur compounds such as thiocresols, etc. The aqueous caustic reacts with the above mentioned impurities and removes them from the refined petroleum fraction. When the reacting power of the aqueous caustic has been largely used up, it is customary to discard the "spent" caustic solution. Because of pollution problems, the spent caustic cannot usually be dumped into streams. Various suggestions have been made for treating the caustic not only to recover useful material therefrom but to convert it into a material which does not represent a disposal problem. Thus, for instance, it has been suggested that the spent caustic be extracted with various solvents to remove the phenolic substances as phenolates dissolved in the solvent. These procedures have involved the use of solvents which are immiscible with water and such solvents have not been found satisfactory because they do not have sufficient power to dissolve salts of the phenolic substances from the aqueous caustic. Other procedures have involved extraction with water-immiscible solvents under conditions which give rise to hydrolysis of the salts of the phenolic substances. However, such procedures require dilution of the spent caustic, additional heating steps and ordinarily involve carrying out operations under pressure in order to obtain substantial hydrolysis. This procedure is not only expensive but results in poor extractions unless thoroughgoing hydrolysis of the salts is first obtained.

This invention has for its object to provide improved procedure for removing phenolic substances from aqueous caustic solutions used to extract petroleum fractions. Another object is to provide procedure whereby salts of phenolic substances can be readily extracted from spent aqueous caustic solutions used to refine petroleum fractions. Another object is to provide improved procedure for removing phenolic substances from spent caustic and simultaneously converting the spent caustic into a caustic solution which may be used to extract further amounts of petroleum fractions. Other objects will appear hereinafter.

These and other objects are accomplished in accordance with our invention which includes extracting an aqueous caustic solution which has been employed to extract petroleum or like fractions with dioxane, acetone or methyl ethyl ketone (hereinafter for convenience referred to as an oxy solvent), separating the oxy solvent layer from the aqueous caustic layer and separating phenolic substances from the oxy solvent layer.

In the following examples and description we have set forth several of the preferred embodiments of our invention, but it is to be understood that they are given by way of illustration and not in limitation thereof.

Our invention is generally applicable to the removal of phenolic and related substances from caustic solutions such as those used to refine petroleum fractions, fractions produced by the hydrogenation of coal, and fractions produced by carbonization of coal. These refining procedures are applied to a variety of fractions such as naphtha, high boiling and low boiling gasoline, kerosene, lubricating oil, etc. While our invention is applicable to recovery from caustic refining of any of these materials, it is of particular value for treating caustic used to extract petroleum fractions in the gasoline boiling point range. Gasoline derived from catalytic and thermal cracking yields caustic solutions containing large amounts of phenolic substances. In these procedures the caustic is usually employed to refine or extract the petroleum fraction repeatedly until its absorbing power has been substantially reduced, in which case the material is known as "spent caustic" although it still contains free alkali metal hydroxide. Usually it is uneconomical to utilize the caustic until it has been substantially spent. Thus the caustic is not re-used even though it still has the power to absorb additional phenolic substances. The concentration of the caustic in its fresh condition usually varies from about 8 to 50 percent, 15 to 30 percent usually being preferred. Our invention is applicable to the recovery of phenolic and related substances from all such spent or partially spent caustic solutions provided they contain above about 5 percent free or unreacted caustic. This alkalinity can be obtained by addition of alkali if necessary.

The amount of oxy solvent employed can be varied considerably. In general we have found an oxy solvent to phenolic substance ratio between about .25 and 5 to be satisfactory. Although somewhat lower ratios than .25 can be used, it is ordinarily uneconomical to use a ratio above about 5. The amount of oxy solvent employed depends upon the amount of phenolic substances present in the aqueous caustic solution. The optimum ratio of oxy solvent to phenolic substance is about 1 when treating spent caustic solutions ordinarily encountered in commercial extraction processes. The primary phenolic substances present are cresols and thiocresols, and the amount of solvent can be calculated by analysis to determine the amount of phenolic substances present and this value used as a basis for the determination of the amount of solvent to employ.

The oxy solvent and spent caustic may be contacted with each other in any desired manner. For instance, the extraction may be carried out in a batch extraction apparatus usually with stirring followed by settling to permit the two layers to form. However, we prefer to employ countercurrent extraction, the aqueous caustic solution being introduced into the upper portion of the countercurrent extractor and the oxy solvent in the lower part of the countercurrent extractor. The solvent passes upwardly extracting the phenolates while the aqueous caustic passes downwardly.

The solvent is removed from the top of the countercurrent extractor or as the upper layer in case a batch extractor is employed. The aqueous caustic in either of the above described methods of extraction is removed from the lower portion of the extractor and may be re-used for extraction of additional petroleum fraction. It is desirable to add make-up caustic to replenish the caustic reacted with the phenolates. The extraction is preferably carried out at about room temperature. However, higher temperatures such as up to about the boiling point of acetone may be used. Hydrolysis of the phenolic salts is not desirable and such conditions do not result in a material amount of hydrolysis.

The solvent extract is then subjected to distillation to remove the solvent which may be re-used for extraction of additional spent caustic. In case dioxane or methyl ethyl ketone is used, some water will be distilled off as an azeotrope. However, the distillate may be directly re-used or it may be dehydrated before re-use. Also when dioxane or methyl ethyl ketone is used, this removal of water will frequently necessitate addition of water to the undistilled phenolate residue. The undistilled residue after removal of solvent from the extract comprises an aqueous solution of salts of phenolic substances and may be acidified to "spring" the phenolic and related substances. Acidification is usually accomplished with an aqueous acid such as sulfuric (10 to 80 percent concentration) or hydrochloric (5 to 35 percent) or by means of carbon dioxide gas. The phenolic and related substances separate as an upper layer and may be removed and, if desired, subjected to distillation to remove water dissolved therein. The lower aqueous layer from the neutralizing operation is removed and may be discarded.

We prefer to employ a two step neutralizing operation in which the undistilled residue from the solvent distillation is first contacted thoroughly with carbon dioxide or preferably flue gas. The carbon dioxide reacts with the caustic alkali and a large amount of the phenolic salts to form free phenolic substances and alkali metal carbonate. The phenolic substances thus released form an upper layer and may be decanted. The lower layer is then preferably filtered to remove carbonate salts. This filtering step is not necessary but is advantageous since it removes salts which would otherwise require acid for neutralization during the final neutralization step. The filtrate thus obtained is then acidified with a mineral acid such as sulfuric or hydrochloric having about the concentrations mentioned above to release the remaining phenolic substances. This two step neutralization operation whether it involves the filtration step or not has the advantage that the thiols associated with the cresols are obtained in higher concentration together with the additional phenolic substances released during the second neutralization. Therefore the first neutralization with carbon dioxide results in release of a purer mixture of cresols or the like.

It is advantageous to employ as neutralizing acid discarded acid from a sulfuric acid alkylation operation. This acid is ordinarily discarded after it has become diluted and slightly contaminated, see "Progress in Petroleum Technology," page 99 et seq., published by American Chemical Society, August 7, 1951. This discarded acid may be directly used for springing the phenolic substances or it may be diluted first with water to remove absorbed hydrocarbons which are released as an immiscible layer which is separated from the acid layer prior to use.

In the accompanying drawings we have illustrated apparatus partly in section in which our invention may be carried out. Figure 1 illustrates apparatus for carrying out a single stage neutralization whereas Figure 2 illustrates apparatus in which the two stage neutralization with intermediate filtration may be carried out.

Referring to Figure 1, numeral 2 designates a countercurrent solvent extractor into the lower portion of which an extracting solvent is introduced through conduit 4. Numeral 6 indicates a conduit for introducing caustic solution to be extracted into the top of extractor 2. The construction of the countercurrent extractor 2 is conventional. The solvent passes upwardly through the extractor while the aqueous caustic passes downwardly. The extracted aqueous caustic is removed from the base of the reactor through conduit 8 and after addition of make-up caustic through conduit 10 is re-used for extraction of additional amounts of phenolic substances from petroleum or like fractions. The solvent is removed from the top of the extractor 2 through conduit 11 and is introduced into the central portion of still 12 where the solvent is distilled off, the vapors are condensed in condenser 14 and the condensate returned through conduit 16 to the base of extractor 2 after addition of any necessary make-up solvent through conduit 18. Only very small amounts of solvent remain in the aqueous caustic after extraction in extractor 2, therefore, only very small amounts of make-up solvent are required.

The distillation in still 12 is of a fractionating type to separate the oxy solvent from the water and phenolic substances associated therewith. The salts of the phenolic substances dissolved in water are removed from the base of still 12 through conduit 20 and are contacted in neutralizer 22 with acid such as sulfuric acid introduced through conduit 24. Neutralizer 22 is provided with an internal partition the upper edge of which acts as a weir. Neutralization of the phenolates and related substances takes place in the larger portion of the neutralizer and the sprung or released phenolic substances rise to the upper surface and flow over the upper edge of partition 26 and accumulate in the compartment formed by this partition. These phenolic substances are then withdrawn through conduit 28 and subjected to distillation to remove water in still 30. The aqueous solution of alkali metal salts of the neutralizing acid are removed from neutralizer 22 through conduit 32 and are either discarded or subjected to extraction for recovery of the small amount of phenolic substances dissolved therein.

Figure 2:
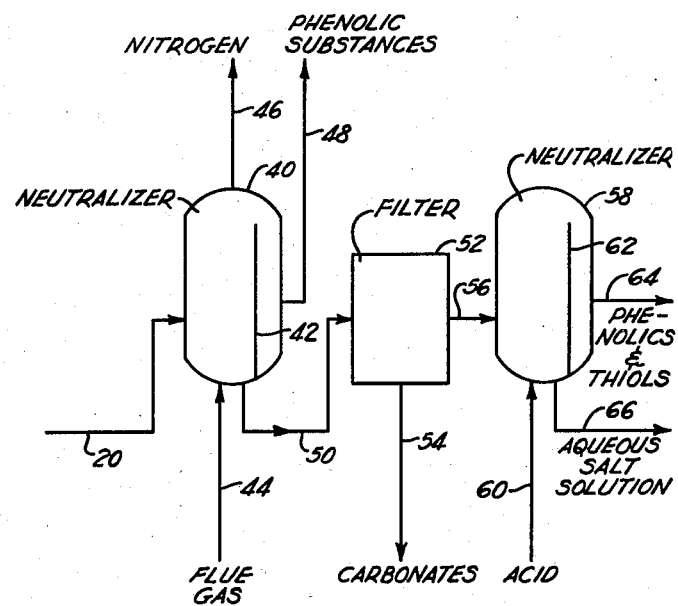

Referring to Figure 2, conduit 20 designates the same conduit 20 illustrated in Figure 1, i. e. the apparatus illustrated in Figure 2 may utilize the same preliminary extraction apparatus and solvent distillation apparatus illustrated in Figure 1. Therefore in Figure 2 the aqueous solution of salts of phenolic substances removed from the base of still 12 is introduced into a first neutralizer 40 which is provided with an internal partition and weir 42. The phenolic aqueous solution is contacted with carbon dioxide or flue gas introduced through conduit 44, and unreacted gas which would largely be nitrogen in the case of flue gas is removed from the top of neutralizer 40 through conduit 46. Phenolic substances which are released by the reaction between the salts of the phenolic substances and the carbon dioxide rise to the surface and overflow partition 42 and collect in the compartment formed thereby and are removed through conduit 48. The aqueous solution containing salts of phenolic substances which have not reacted with the carbon dioxide is removed from the base of neutralizer 40 through conduit 50 and is introduced into filter 52 where precipitated or suspended carbonates such as sodium or potassium, depending upon the alkali used, are filtered off and removed by way of conduit 54. The aqueous solution of phenolic salts then passes through conduit 56 into second neutralizer 58 where it is contacted with acid such as sulfuric acid introduced through conduit 60. This neutralization releases additional amounts of phenolic substances including large amounts of thiols. These materials rise to the surface and overflow partition 62 and are removed through conduit 64. The aqueous solution containing salts formed by reaction between the caustic and the acid is removed through conduit 66 and is discarded or extracted for recovery of the small amount of phenolic substances contained therein.

It is unnecessary to subject the phenolic or sulfur-containing substances separated in accordance with our invention to the final dehydrating step illustrated in Figure 1. However, for many applications a dehydrated phenolic substance is desired and in such case the final dehydration step is advantageous.

Although dioxane, acetone and methyl ethyl ketone employed for the initial extraction have substantial solubility in water, nevertheless these oxy solvents are substantially insoluble in the aqueous caustic solution. Therefore, by operating in accordance with our invention, we are able to utilize the high solvent power of these oxy solvents for the salts of the phenolic substances without resultant solution of these solvents in the aqueous caustic. As indicated above, the amount of oxy solvent remaining dissolved in the aqueous caustic is very small and can be neglected for all practical purposes. We prefer to employ acetone as a solvent since upon distillation of the extract, acetone can be readily recovered free of water. This simplifies the purification procedure prior to re-use of the solvent. Also acetone has excellent solvent power for the phenolic salts. When dioxane or methyl ethyl ketone is used, the overhead from the distillation contains some water which forms an azeotropic mixture with the dioxane or methyl ethyl ketone. This azeotrope may be and preferably is re-used as a solvent. However in some cases it is desirable to remove the water before re-using the solvent. This can be accomplished by adding a substance which forms a low boiling binary or ternary azeotrope with the water. Thus benzene in amount sufficient to form a benzene-water (8 percent azeotrope (B. P. 69.3° C.) may be added. The resultant mixture is distilled to remove the azeotrope as distillate.

Where carbon dioxide is employed to neutralize the aqueous solution of the phenolic substances, it is impossible to obtain complete neutralization. However, it is not necessary to obtain a complete reaction. We prefer to contact with carbon dioxide until a pH about equal to that of sodium carbonate is obtained, i. e. a pH of about 10 to 11.5.

*Example I*

A heavy gasoline produced by fluid catalytic cracking of petroleum gas oil which contained sulfur was extracted with an aqueous sodium hydroxide solution containing 28 percent sodium hydroxide to remove phenolic and related sulfur-containing materials. One hundred pounds (9.81 gallons) of spent caustic obtained during this extraction and containing 12 percent free sodium hydroxide were extracted with 64.6 pounds (9.81 gallons) of acetone in a countercurrent extractor. The raffinate amounted to 29.2 pounds (2.65 gallons) of aqueous 30.8 percent sodium hydroxide. The extract amounted to 135.4 pounds (16 gallons) and was subjected to distillation to remove the acetone as distillate. 63.8 pounds (98.7 percent recovery) of acetone was recovered as distillate. The undistilled residue amounting to 71.6 pounds (6.3 gallons) was diluted with 113 pounds (13.6 gallons) of water and neutralized with 22.7 pounds (1.6 gallons) of 60 Baumé sulfuric acid. The water insoluble layer formed during neutralization was decanted and subjected to distillation to remove water (1.6 pounds) and a light oil amounting to 0.9 pound which contained 23 percent sulfur. The undistilled residue from this dehydrating step was dried cresols amounting to 31.2 pounds and containing 6.9 percent sulfur.

*Example II*

One hundred pounds of the same spent caustic described in Example I was extracted with 64.6 pounds of acetone in the same manner described in Example I to obtain the same extract and raffinate described in Example I. The extract was distilled as described in Example I to remove the acetone and to obtain 71.6 pounds of undistilled residue containing phenolates. This residue was diluted with 92 pounds (11 gallons) of water and contacted at room temperature and approximately atmospheric pressure with 588 cubic feet of flue gas containing 11 percent carbon dioxide. The water insoluble layer of phenolic substances released by the carbon dioxide neutralization was separated and subjected to distillation to remove water (1.6 pounds) and a light oil (0.6 pound) containing thiol compounds corresponding to 13 percent sulfur. The undistilled residue from this dehydrating step was dried cresols amounting to 24 pounds containing thiol compounds corresponding to 3.9 percent sulfur. The aqueous solution from the carbon dioxide neutralization was neutralized with 22.1 pounds (1.55 gallons) of 60 Baumé sulfuric acid. The water insoluble phenolic layer thus formed was removed and subjected to distillation to remove water. 6.8 pounds of dried cresols containing thiol compounds corresponding to 18 percent sulfur were obtained.

The thiols which are separated with the cresols, xylenols and related oxygen-containing materials are closely related to the cresols, xylenols and oxygen-containing materials. The primary difference is the fact that the oxygen is replaced by sulfur. Sulfur and oxygen are of course closely related elements. It is accordingly to be understood that the expression "phenolic substance" or "substances" as used herein and in the claims includes phenols, cresols and xylenols as well as the corresponding or related sulfur-containing thiols.

We claim:

1. The method for recovering phenolic substances from aqueous caustic solutions which have been employed to extract phenolic containing fractions which process comprises extracting the aqueous caustic solution with an oxy solvent selected from the group consisting of dioxane, acetone and methyl ethyl ketone, whereby an aqueous caustic layer and a solvent layer containing dissolved salts of phenolic compounds are formed, separating the solvent layer from the aqueous caustic layer and separating phenolic substances from the solvent layer.

2. The method for recovering phenolic substances from aqueous caustic solutions which have been employed to extract phenolic containing fractions which process comprises extracting the aqueous caustic solution containing above about 5 percent free alkali with an oxy solvent selected from the group consisting of dioxane, acetone and methyl ethyl ketone, whereby an aqueous caustic layer and an oxy solvent layer containing dissolved salts of phenolic compounds are formed, separating the oxy solvent layer from the aqueous caustic layer and separating phenolic substances from the oxy solvent layer.

3. The process defined in claim 2 in which the oxy solvent layer is subjected to distillation and the undistilled residue is treated with discard acid from a sulfuric acid alkylation operation to release the phenolic substances.

4. The method for recovering phenolic substances from aqueous caustic solutions which have been employed to extract petroleum fractions which process comprises extracting the aqueous caustic solution containing above about 5 percent free alkali with a solvent comprising essentially dioxane, whereby an aqueous caustic layer and a dioxane layer containing dissolved salts of phenolic compounds are formed, separating the dioxane layer from the aqueous caustic layer, distilling off the dioxane from the dioxane layer, acidifying the undistilled residue and separating phenolic substances therefrom.

5. The method for recovering phenolic substances from aqueous caustic solutions which have been employed to extract petroleum fractions which process comprises extracting the aqueous caustic solution containing above about 5 percent free alkali with a solvent comprising essentially acetone, whereby an aqueous caustic layer and an acetone layer containing dissolved salts of phenolic compounds are formed, separating the acetone layer from the aqueous caustic layer, distilling off the acetone from the acetone layer, acidifying the undistilled residue and separating phenolic substances therefrom.

6. The method for recovering phenolic substances from aqueous caustic solutions which have been employed to extract petroleum fractions which process comprises extracting the aqueous caustic solution containing above about 5 percent free alkali with a solvent comprising essentially methyl ethyl ketone, whereby an aqueous caustic layer and a methyl ethyl ketone layer containing dissolved salts of phenolic compounds are formed, separating the ketone layer from the aqueous caustic layer, distilling off the ketone from the ketone layer, acidifying the undistilled residue and separating phenolic substances therefrom.

7. The method for recovering phenolic substances from aqueous caustic solutions which have been employed to extract petroleum fractions which process comprises extracting the aqueous caustic solution containing above about 5 percent free alkali with a solvent comprising essentially methyl ethyl ketone, whereby an aqueous caustic layer and a methyl ethyl ketone layer containing dissolved salts of phenolic compounds are formed, separating the ketone layer from the aqueous caustic layer, distilling off an azeotrope of the ketone and water from the ketone layer and re-using this azeotrope to extract additional phenolic salts from an aqueous caustic solution, acidifying the undistilled residue from which the azeotrope was distilled and separating phenolic substances therefrom.

8. The method for recovering phenolic substances from aqueous caustic solutions which have been employed to extract a member of the group consisting of catalytic and thermal gasoline which process comprises extracting the aqueous caustic solution containing above about 5 percent free alkali with an oxy solvent selected from the group consisting of dioxane, acetone and methyl ethyl ketone, whereby an aqueous caustic layer and an oxy solvent layer containing dissolved salts of phenolic compounds are formed, separating the oxy solvent layer from the aqueous caustic layer, distilling off the oxy solvent from the oxy solvent layer, acidifying the undistilled residue and separating phenolic substances therefrom.

9. The process for recovering phenolic substances from an aqueous caustic extract of a petroleum fraction which contains phenolic substances which process comprises extracting the aqueous caustic containing above about 5 percent free alkali with an oxy solvent selected from the group consisting of dioxane, acetone and methyl ethyl ketone whereby an aqueous caustic layer and an oxy solvent layer containing dissolved salts of phenolic substances are formed, separating the aqueous caustic layer and re-using it for the extraction of additional petroleum fraction containing phenolic substances, subjecting the oxy solvent layer to distillation to separate the oxy solvent, re-using the oxy solvent for extraction of additional aqueous caustic solution containing phenolic substances, contacting the material remaining after removal of the oxy solvent with carbon dioxide, separating an upper layer comprising phenolic substances from the carbon dioxide treated mixture, acidifying the lower layer with a mineral acid to release additional phenolic substances including a larger amount of thiols and separating the phenolic substances and thiols from this acidified mixture.

10. The process of recovering phenolic substances from an aqueous caustic extract of a petroleum fraction which contains phenolic substances which process comprises extracting the aqueous caustic containing above about 5 percent free alkali with an oxy solvent selected from the group consisting of dioxane, acetone and methyl ethyl ketone, whereby an aqueous caustic layer and an oxy solvent layer containing dissolved salts of phenolic substances are formed, separating the aqueous caustic layer and re-using it for the extraction of additional petroleum fraction containing phenolic substances, subjecting the oxy solvent layer to distillation to remove the oxy solvent, re-using the solvent distillate for extraction of additional aqueous caustic solution containing phenolic substances, contacting the material remaining after distillation of the oxy solvent with carbon dioxide, separating an upper layer comprising phenolic substances from the carbon dioxide treated mixture, filtering the lower layer from the carbon dioxide treatment to separate precipitated carbonate salts, acidifying the filtrate with a mineral acid to release additional phenolic substances including a larger amount of thiols and separating the phenolic substances and thiols from this acidified mixture.

11. The process for recovering phenolic substances from an aqueous caustic extract of a petroleum fraction which contains phenolic substances which process comprises extracting the aqueous caustic containing above about 5 percent free alkali with dioxane, whereby an aqueous caustic layer and a dioxane layer containing dissolved salts of phenolic substances are formed, separating the aqueous caustic layer and re-using it for the extraction of additional petroleum fraction containing phenolic substances, subjecting the dioxane layer to distillation to separate the dioxane, re-using the dioxane for extraction of additional aqueous caustic solution containing phenolic substances, contacting the material remaining after removal of the dioxane with carbon dioxide, separating an upper layer comprising phenolic substances from the carbon dioxide treated mixture, acidifying the lower layer with a mineral acid to release additional phenolic substances including a larger amount of thiols and separating the phenolic substances and thiols from this acidified mixture.

12. The process of recovering phenolic substances from an aqueous caustic extract of a petroleum fraction which contains phenolic substances which process comprises extracting the aqueous caustic containing above about 5 percent free alkali with a solvent comprising essentially acetone, whereby an aqueous caustic layer and an acetone layer containing dissolved salts of phenolic substances are formed, separating the aqueous caustic layer and re-using it for the extraction of additional petroleum fraction containing phenolic substances, subjecting the acetone layer to distillation to remove the acetone, re-using the acetone distillate for extraction of additional aqueous caustic solution containing phenolic substances, contacting the material remaining after distillation of the acetone with carbon dioxide, separating an upper layer comprising phenolic substances from the carbon dioxide treated mixture, filtering the lower layer from the carbon dioxide treatment to separate precipitated carbonate salts, acidifying the filtrate with a mineral acid to release additional phenolic substances and a substantial amount of thiols and separating the phenolic substances and thiols from this acidified mixture.

13. The process of recovering phenolic substances from an aqueous caustic extract of a petroleum fraction which contains phenolic substances which process comprises extracting the aqueous caustic containing above about 5 percent free alkali with a solvent comprising essentially methyl ethyl ketone, whereby an aqueous caustic layer and a ketone layer containing dissolved salts of phenolic substances are formed, separating the aqueous caustic layer and re-using it for the extraction of additional petroleum fraction containing phenolic substances, subjecting the ketone layer to distillation to remove the ketone, re-using the ketone distillate for extraction of additional aqueous caustic solution containing phenolic substances, contacting the material remaining after distillation of the ketone with carbon dioxide, separating an upper layer comprising phenolic substances from the carbon dioxide treated mixture, filtering the lower layer from the carbon dioxide treatment to separate precipitated carbonate salts, acidifying the filtrate with a mineral acid to release additional phenolic substances and a substantial amount of thiols and separating the phenolic substances and thiols from this acidified mixture.

References Cited in the file of this patent

UNITED STATES PATENTS 2,048,784    Drennan    July 28, 1936
2,391,128    Cauley et al.    Dec. 18, 1945

OTHER REFERENCES

McElvain, S. W.: The Characterization of Organic Compounds, 1953, p. 74; MacMillan Co., New York, N. Y.

Handbook of Chemistry and Physics, Chem. Rubber Co., 36th ed., 1954–55, p. 596.